United States Patent
Lisi et al.

(10) Patent No.: US 9,337,905 B2
(45) Date of Patent: May 10, 2016

(54) INDUCTIVE STRUCTURES WITH REDUCED EMISSIONS AND INTERFERENCE

(71) Applicant: Texas Instruments Incorporated, Dallas, TX (US)

(72) Inventors: Gianpaolo Lisi, Los Gatos, CA (US); Gerard Socci, Palo Alto, CA (US); Ali Djabbari, Saratoga, CA (US); Rajaram Subramoniam, Cupertino, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 49 days.

(21) Appl. No.: 14/026,515

(22) Filed: Sep. 13, 2013

(65) Prior Publication Data
US 2015/0004904 A1 Jan. 1, 2015

Related U.S. Application Data

(60) Provisional application No. 61/876,796, filed on Sep. 12, 2013, provisional application No. 61/841,765, filed on Jul. 1, 2013.

(51) Int. Cl.
*H04B 5/00* (2006.01)

(52) U.S. Cl.
CPC ............ *H04B 5/0087* (2013.01); *H04B 5/0031* (2013.01); *H04B 5/0037* (2013.01)

(58) Field of Classification Search
CPC .......... H04B 5/0025; H04B 5/31; H04B 5/37; H04B 5/05; H04B 5/75; H04B 5/81; H04B 5/87; H04B 5/93
USPC ....................................... 455/41.1, 41.2, 41.3
See application file for complete search history.

(56) References Cited

U.S. PATENT DOCUMENTS

| | | | |
|---|---|---|---|
| 8,527,688 B2* | 9/2013 | Chatterjee et al. | 710/303 |
| 2002/0177409 A1* | 11/2002 | Raggam | 455/41 |
| 2007/0018816 A1* | 1/2007 | Matsui et al. | 340/551 |
| 2009/0227205 A1* | 9/2009 | Rofougaran | 455/41.1 |
| 2013/0241302 A1* | 9/2013 | Miyamoto et al. | 307/104 |
| 2014/0168019 A1* | 6/2014 | Hirobe et al. | 343/720 |

OTHER PUBLICATIONS

Bieler et al., Thierry, "Contactless Power and Information Transmission", IEEE Transactions on Industry Applications, Sep./Oct. 2002, vol. 38, No. 5, pp. 1266-1272, Chicago, IL.

Bieler et al., Thierry, "Contactless Power and Information Transmission", IEEE Transaction on Industry Applications, Sep./Oct. 2002, vol. 38, No. 5, pp. 1266-1272, Lausanne, Switzerland.

* cited by examiner

*Primary Examiner* — Wen Huang
(74) *Attorney, Agent, or Firm* — Michael A. Davis, Jr.; Frank D. Cimino

(57) ABSTRACT

An inductive structure includes a power coil and a data coil. The data coil is substantially centered within the power coil. A first portion of the data coil conducts current in a first direction. A second portion of the data coil conducts current in a second direction opposite the first direction. The first portion of the data coil is connected at a node to the second portion of the data coil. The node is coupled to a ground.

15 Claims, 3 Drawing Sheets

INDUCTIVE STRUCTURES WITH REDUCED EMISSIONS AND INTERFERENCE

CROSS-REFERENCE TO RELATED APPLICATIONS

This application claims priority to: (a) U.S. Provisional Patent Application Ser. No. 61/841,765, filed Jul. 1, 2013, entitled A METHOD TO IMPROVE COMMON MODE TRANSIENT IMMUNITY FOR INDUCTIVE STRUCTURES, naming Rajaram Subramonian et al. as inventors; and (b) U.S. Provisional Patent Application Ser. No. 61/876, 796, filed Sep. 12, 2013, entitled A METHOD TO IMPROVE COMMON MODE TRANSIENT IMMUNITY FOR INDUCTIVE STRUCTURES, naming Rajaram Subramonian et al. as inventors. All of the above-identified applications are hereby fully incorporated herein by reference for all purposes.

This application is related to co-owned co-pending U.S. patent application Ser. No. 14/311,354, filed on Jun. 23, 2014, entitled INDUCTIVE STRUCTURES WITH REDUCED EMISSIONS AND INTERFERENCE, naming Rajaram Subramonian et al. as inventors.

BACKGROUND

The disclosures herein relate in general to electronic structures, and in particular to inductive structures with reduced emissions and interference.

An inductively coupled structure (or "inductive structure") is useful for transmitting power and/or data from one or more transmitters to one or more receivers across an isolation barrier. If such power and data are transmitted through a single channel of an inductive structure, then various challenges and limitations may arise. However, if such power and data are transmitted through multiple channels of an inductive structure, then other challenges and limitations may arise (e.g., increased size, cost, emissions and/or interference).

SUMMARY

An inductive structure includes a power coil and a data coil. The data coil is substantially centered within the power coil. A first portion of the data coil conducts current in a first direction. A second portion of the data coil conducts current in a second direction opposite the first direction. The first portion of the data coil is connected at a node to the second portion of the data coil. The node is coupled to a ground.

DETAILED DESCRIPTION

Figure 1:
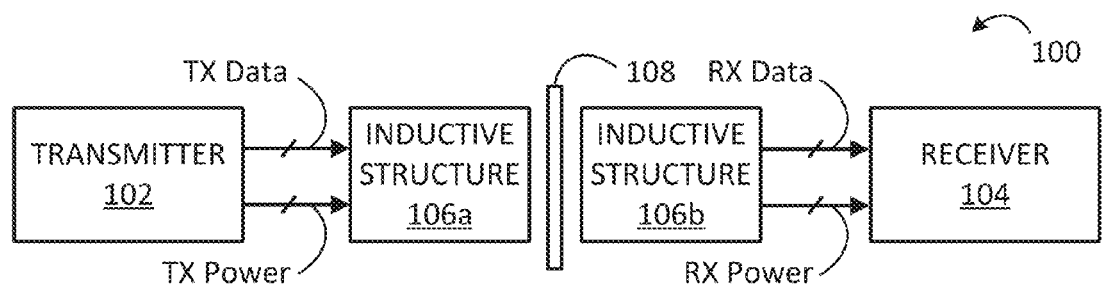
FIG. 1 is a block diagram of a system of the illustrative embodiments.

FIG. 1 is a block diagram of a system, indicated generally at 100, of the illustrative embodiments. A transmitter 102 outputs data and power to a receiver 104 through a device that includes inductive structures 106a and 106b (collectively, "inductive structure 106"). The inductive structure 106a: (a) receives the data from the transmitter 102 through differential TX Data lines; (b) receives the power from the transmitter 102 through differential TX Power lines; and (c) outputs the data and power by inductive coupling across an isolation barrier 108 to the inductive structure 106b. The inductive structure 106b: (a) receives the data and power by inductive coupling across the isolation barrier 108 from the inductive structure 106a; (b) outputs the data to the receiver 104 (which receives the data) through differential RX Data lines; and (c) outputs the power to the receiver 104 (which receives the power) through differential RX Power lines.

Figure 2:
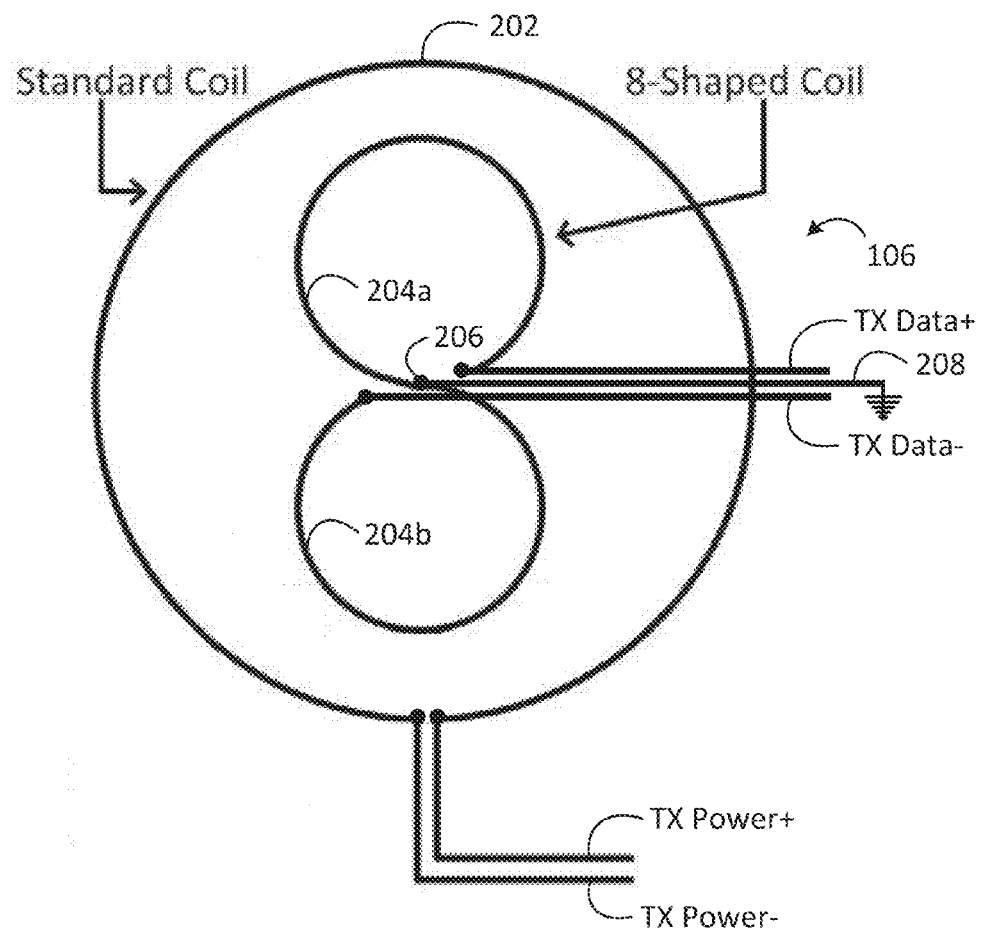
FIG. 2 is a schematic plan view of an inductive structure of FIG. 1.

FIG. 2 is a schematic plan view of the inductive structure 106. As shown in FIG. 2, the inductive structure 106a includes: (a) a standard power coil 202 connected to the differential TX Power lines, namely TX Power+ and TX Power−; and (b) data coils 204a and 204b (collectively, "data coil 204") connected to the differential TX Data lines, namely TX Data+ (connected to the data coil 204a) and TX Data− (connected to the data coil 204b). Also, the data coil 204a is connected to the data coil 204b at a node 206, which is coupled through a center tap ground line 208 to a first ground.

The data coil 204 is substantially centered within the power coil 202. Accordingly, the data coil 204 is smaller than the power coil 202. Because the data coil 204 is located (e.g., formed) within the center of the power coil 202, the inductive structure 106 has reduced size and cost.

Also, the data coil 204 is formed to have a relatively symmetric shape (e.g., symmetric 8-shape). As shown in FIG. 2, the data coil 204b is substantially identical to (yet reversed from) the data coil 204a. If current flows through the data coil 204a in one direction (e.g., clockwise), then current flows through the data coil 204b in an opposite direction (e.g., counterclockwise). Moreover, the center tap ground line 208 helps to substantially equalize a voltage between TX Data+ and the ground line 208 ("TX Data+ voltage"), relative to a voltage between TX Data− and the ground line 208 ("TX Data+ voltage").

In this example, an alternating current flows through the power coil 202. A magnetic field induced by the power coil 202 on the data coil 204a results in an electromotive force that is substantially equal in magnitude to (yet opposite in polarity from) an electromotive force induced by the power coil 202 on the data coil 204b, so an effect of magnetic flux from the power coil 202 on the data coil 204a is substantially counterbalanced (e.g., cancelled) by an effect of magnetic flux from the power coil 202 on the data coil 204b. Accordingly, the power coil 202 induces a relatively small difference (if any) between TX Data+ voltage and TX Data− voltage, even if the data coils 204a and 204b might have slight differences (e.g., in size and/or shape) from one another.

Further, an alternating current flows through the data coil 204. A magnetic field induced by the data coil 204a on the power coil 202 is substantially equal in magnitude to (yet opposite in polarity from) a magnetic field induced by the data coil 204b on the power coil 202, so an effect of magnetic flux from the data coil 204a on the power coil 202 is substantially counterbalanced (e.g., cancelled) by an effect of magnetic flux from the data coil 204b on the power coil 202. Accordingly, the data coil 204 induces a relatively small difference (if any) between TX Power+ voltage and TX Power− voltage, even if the data coils 204a and 204b might have slight differences (e.g., in size and/or shape) from one another.

In that manner: (a) the data coil 204 has reduced overall exposure to potential fields generated by the power coil 202, and vice versa; (b) cross-coupling between the power coil 202 and the data coil 204 is relatively small; and (c) the relatively symmetric shape (e.g., symmetric 8-shape) of the data coil 204 reduces interference between the data coil 204 and the power coil 202 (e.g., helps to preserve integrity of the data).

Figure 3:
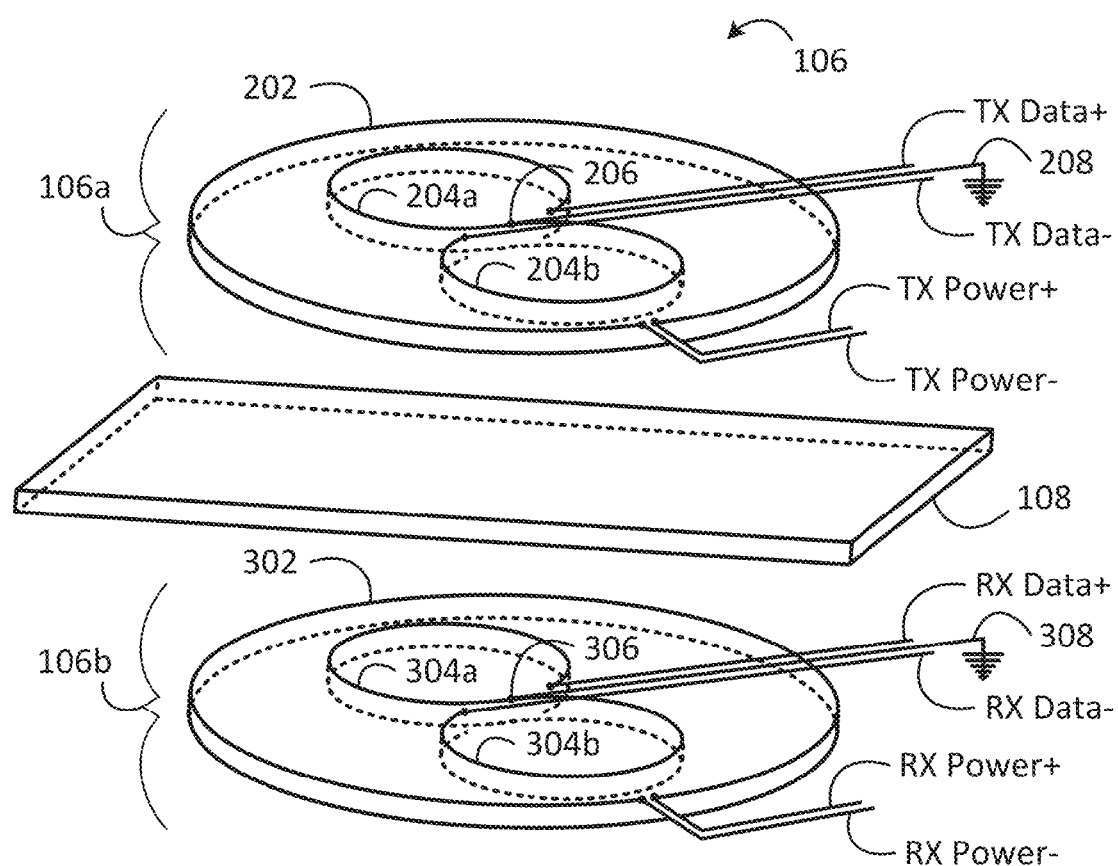
FIG. 3 is a schematic perspective view of the inductive structure of FIG. 1.
Figure 4:
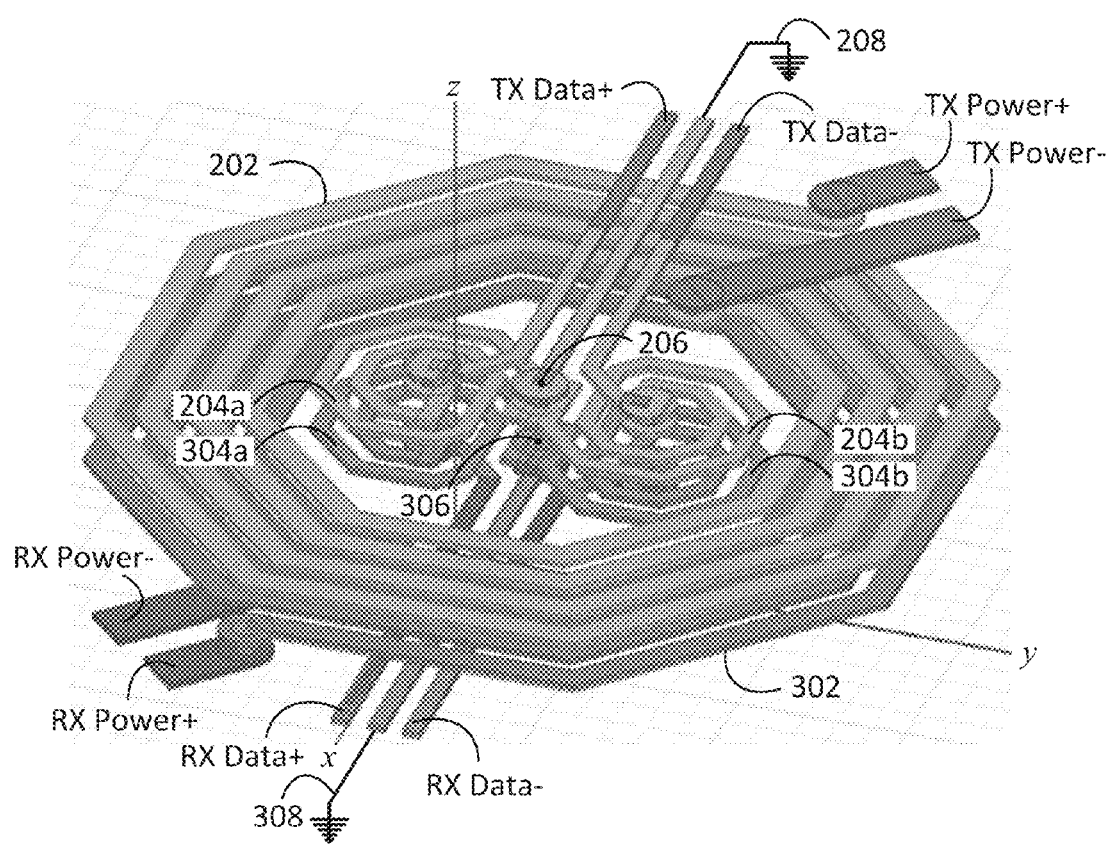
FIG. 4 is a structural perspective view of the inductive structure of FIG. 1.

FIG. 3 is a schematic perspective view of the inductive structure 106. FIG. 4 is a structural perspective view of the inductive structure 106. FIGS. 3 and 4 are not necessarily drawn to scale. As shown in FIGS. 3 and 4, the inductive structure 106b is substantially identical to the inductive structure 106a. Further, as shown in the example of FIG. 4, the power coils 202 and 302 have multiple turns, and the data coils 204 and 304 have multiple turns.

Accordingly, the inductive structure 106b includes: (a) a standard power coil 302 connected to the differential RX Power lines, namely RX Power+ and RX Power−; and (b) data coils 304a and 304b (collectively, "data coil 304") connected to the differential RX Data lines, namely RX Data+ (connected to the data coil 304a) and RX Data− (connected to the data coil 304b). Also, the data coil 304a is connected to the data coil 304b at a node 306, which is coupled through a center tap ground line 308 to a second ground that is isolated from the first ground (e.g., isolated from the center tap ground line 208).

The data coil 304 is substantially centered within the power coil 302. Accordingly, the data coil 304 is smaller than the power coil 302. Because the data coil 304 is located (e.g., formed) within the center of the power coil 302, the inductive structure 106 has reduced size and cost.

Also, the data coil 304 is formed to have a relatively symmetric shape (e.g., symmetric 8-shape). As shown in FIGS. 3 and 4, the data coil 304b is substantially identical to (yet reversed from) the data coil 304a. If current flows through the data coil 304a in one direction (e.g., clockwise), then current flows through the data coil 304b in an opposite direction (e.g., counterclockwise). Moreover, the center tap ground line 308 helps to substantially equalize a voltage between RX Data+ and the ground line 308 ("RX Data+ voltage"), relative to a voltage between RX Data− and the ground line 308 ("RX Data+ voltage").

Further, as shown in FIGS. 3 and 4, the inductive structures 106a and 106b are aligned with one another (e.g., the data coils 204a and 304a are aligned with one another, and the data coils 204b and 304b are aligned with one another), so that: (a) the power coils 202 and 302 have relatively good coupling with one another; (b) the data coils 204 and 304 have relatively good coupling with one another; (c) cross-coupling between the power coil 202 and the data coil 304 is relatively small; (d) cross-coupling between the power coil 302 and the data coil 204 is relatively small; and (e) radiated emissions are relatively small (e.g., as radiated by the data coils 204 and 304), which helps with electromagnetic interference ("EMI") certification.

Although illustrative embodiments have been shown and described by way of example, a wide range of alternative embodiments is possible within the scope of the foregoing disclosure.

What is claimed is:

1. A device, comprising:
a first inductive structure including a first power coil and a first data coil, wherein: the first data coil is substantially centered within the first power coil; a first portion of the first data coil is for conducting current in a first direction; a second portion of the first data coil is for conducting current in a second direction opposite the first direction; the first portion of the first data coil is connected at a first node to the second portion of the first data coil; and the first node is coupled to a first ground; and
a second inductive structure including a second power coil and a second data coil, wherein: the second data coil is substantially centered within the second power coil; a first portion of the second data coil is aligned with the first portion of the first data coil for conducting current in the first direction; a second portion of the second data coil is aligned with the second portion of the first data coil for conducting current in the second direction; the first portion of the second data coil is connected at a second node to the second portion of the second data coil; and the second node is coupled to a second ground isolated from the first ground;
wherein the first power coil is for: receiving power without data from a transmitter; and outputting the power without data by inductive coupling to the second power coil; and
wherein the second power coil is for: receiving power without data by inductive coupling from the first power coil; and outputting the power without data to a receiver.

2. The device of claim 1, and comprising:
an isolation barrier between the first and second inductive structures.

3. The device of claim 1, wherein the first data coil is for: receiving data from a transmitter; and outputting the data by inductive coupling to the second data coil.

4. The device of claim 1, wherein the second data coil is for: receiving data by inductive coupling from the first data coil; and outputting the data to a receiver.

5. The device of claim 1, wherein the first and second inductive structures are substantially identical to one another.

6. The device of claim 5, wherein the first and second portions the first data coil are substantially identical to one another, yet reversed from one another.

7. A method, comprising:
conducting current in a first direction through a first portion of a first data coil of a first inductive structure, wherein the first inductive structure includes a first power coil within which the first data coil is substantially centered;
with the first power coil, receiving power without data from a transmitter, and outputting the power without data by inductive coupling to the second power coil;
conducting current in a second direction through a second portion of the first data coil, wherein: the second direction is opposite the first direction; the first portion of the first data coil is connected at a first node to the second portion of the first data coil; and the first node is coupled to a first ground;
conducting current in the first direction through a first portion of a second data coil of a second inductive structure, wherein: the second inductive structure includes a second power coil within which the second data coil is substantially centered; and the first portion of the second data coil is aligned with the first portion of the first data coil;
with the second power coil, receiving power without data by inductive coupling from the first power coil, and outputting the power without data to a receiver; and
conducting current in the second direction through a second portion of the second data coil, wherein: the second portion of the second data coil is aligned with the second portion of the first data coil; the first portion of the second data coil is connected at a second node to the second portion of the second data coil; and the second node is coupled to a second ground isolated from the first ground.

8. The method of claim 7, and comprising:
inductive coupling the first inductive structure to the second inductive structure, across an isolation barrier between the first and second inductive structures.

9. The method of claim 7, and comprising:
with the first data coil, receiving data from a transmitter; and outputting the data by inductive coupling to the second data coil.

10. The method of claim 7, and comprising:
with the second data coil, receiving data by inductive coupling from the first data coil; and
outputting the data to a receiver.

11. The method of claim 7, wherein the first and second inductive structures are substantially identical to one another.

12. The method of claim 11, wherein the first and second portions the first data coil are substantially identical to one another, yet reversed from one another.

13. A device, comprising:
a first inductive structure including a first power coil and a first data coil, wherein the first data coil has a symmetric 8-shape substantially centered within the first power coil;
a second inductive structure including a second power coil and a second data coil, wherein the second data coil has the symmetric 8-shape substantially centered within the second power coil, and wherein the first and second data coils are aligned with one another;
an isolation barrier between the first and second inductive structures;
wherein the first power coil is for: receiving power without data from a transmitter; and outputting the power without data by inductive coupling across the isolation barrier to the second power coil;
wherein the second power coil is for: receiving the power without data by inductive coupling across the isolation barrier from the first power coil; and outputting the power without data to a receiver;
wherein the first data coil is for: receiving data from the transmitter; and outputting the data by inductive coupling across the isolation barrier to the second data coil; and
wherein the second data coil is for: receiving the data by inductive coupling across the isolation barrier from the first data coil; and outputting the data to the receiver.

14. The device of claim 13, wherein the first and second inductive structures are substantially identical to one another.

15. The device of claim 13, wherein a center of the symmetric 8-shape of the first data coil is coupled to a first ground; and a center of the symmetric 8-shape of the second data coil is coupled to a second ground isolated from the first ground.

* * * * *